United States Patent [19]

Adams

[11] 4,014,360

[45] Mar. 29, 1977

[54] PLURAL-SERVICE HYDRAULIC SYSTEM

[75] Inventor: Frederick John Adams, Campton, England

[73] Assignee: TRW Inc., Cleveland, Ohio

[22] Filed: May 31, 1974

[21] Appl. No.: 475,119

[30] Foreign Application Priority Data

May 31, 1972 United Kingdom ............. 25981/72

[52] U.S. Cl. .................................. 137/118; 60/422

[51] Int. Cl.[2] .......................................... G05D 11/02

[58] Field of Search .................... 60/413, 418, 422; 137/118

[56] References Cited

UNITED STATES PATENTS

| | | | |
|---|---|---|---|
| 1,917,316 | 7/1933 | Naab | 137/118 |
| 2,170,890 | 8/1939 | Allen | 60/418 X |
| 2,846,850 | 8/1958 | Hall | 137/118 X |
| 3,011,506 | 12/1961 | Schwartz | 137/118 X |

FOREIGN PATENTS OR APPLICATIONS

| | | | |
|---|---|---|---|
| 558,700 | 3/1957 | Italy | 137/118 |
| 586,975 | 4/1947 | United Kingdom | |
| 589,095 | 6/1947 | United Kingdom | |
| 820,118 | 9/1959 | United Kingdom | |
| 1,302,741 | 1/1973 | United Kingdom | |

*Primary Examiner*—Robert G. Nilson

[57] ABSTRACT

A pump or other source supplies hydraulic fluid under pressure to a plurality of slave services which require a pre-selected priority of supply such as, e.g., brakes (first priority), power steering (second priority), and self-leveling device (third priority). A valve having a resiliently loaded spool is connected between the pressurized fluid source and the slave services, with the source pressure acting in opposition to the resilient loading on the spool so that the position of the spool is influenced by the source pressure. Accordingly, if the source pressure falls below a pre-determined value the resilient loading displaces the valve spool so as to cut off supply of fluid to the least essential service; if the source pressure falls below a second and lower value the spool is further displaced to cut off supply to the second priority service, and so on. Provision is made to leave the first priority service (e.g., brakes) always connected. A pressure accumulator may be connected between the fluid source and the valve. A Euler strut-type spring may be employed to provide the resilient loading so as to provide a "snap" spool displacement action to open or close the lower priority slave services in response to source pressure.

9 Claims, 4 Drawing Figures

5
3
2
4
30
34
35B
35A
31
35C
38
38C
36B
39
31A
37
37
36
35
36A
32
33

PLURAL-SERVICE HYDRAULIC SYSTEM

This invention relates to a hydraulic system of the kind in which a source of pressure-fluid is required to serve a plurality of receiving or "slave" services. In road vehicles for example, a single pump may be required to serve the brake system, power or power-assisted steering gear, and self-levelling means. In order to enable an economically small pump to be used as the primary source of pressure fluid, a pressure accumulator is provided which is charged by the pump and which provides sufficient pressure fluid to meet normally-expected peak demands. However, in case there should occur a partial or total pump failure, or a partial pressure source failure of any kind, or a drop in source pressure due to unexpectedly prolonged or repeated peak demand, it is arranged according to the invention that one or more of the services is automatically cut off from the source (so as to reduce the demand) leaving a more essential service (or services) unimpaired. The system thus affords "priorities" of service. A system having the foregoing properties will hereinafter be termed a system of the kind stated.

There have been previous proposals in relation to hydraulic systems for vehicles, in which the available hydraulic pressure actuates valve means selectively controlling supply of pressure fluid to a plurality of slave services e.g. braking and steering. In some of these proposals one of the services supplied may be a pressure accumulator which in turn supplies one or a group of slave services. In no previous proposal known to us, has it been suggested to use the distinctive feature that all of a plurality of slave services should be supplied by an accumulator (so that even if there were a total pump failure, a minimal and the presumed most important slave service e.g. brakes, might be sufficiently maintained at least for an emergency period). Nor has it to our knowledge been proposed that, in a system having more than two slave services, the whole plurality could be so arranged by valve means as to enjoy an order or priority in the event of a partial or progressive failure of source pressure. The present invention has as its main aim, the availability to all services of accumulated pressure, and the provision by simple valve means of priority of supply within a plurality of slave services leaving always one — the "top priority" — service in a supplied condition at least so long as any pressure is available.

A system of the kind stated according to the invention includes a resiliently loaded valve which, according to its position, connects the accumulator to all or to a particular one or more of the slave services, its position being determined by the source pressure in opposition to the resilient load. Thus if the pressure falls below a first selected value the spring urges the valve so as to cut off the least essential service; below a second and lower value to cut off a second service, and so on, leaving the most essential service (which in a vehicle will probably be the brakes) always connected.

Further according to the invention, there is provided a system of the kind stated including a source of pressure and a pressure accumulator connected so as to be charged by said source, the charge contents of which accumulator are available to at least one slave service through valve means the opening and closing of which is governed by the accumulator pressure opposed to resilience, such opening and closing allowing or preventing flow of pressure-fluid from the accumulator to a corresponding slave service.

The valve preferably takes the form of a spool slidable in a valve body, one end of the spool being exposed in piston-like manner to the accumulator pressure and there being spring means to urge the spool against such pressure.

The system preferably has a single line connecting the accumulator to the valve; but there may in a variant be a second line directly connecting the source to the valve for the direct operation of the valve by source pressure as contrasted with accumulator pressure, there being a non-return valve between the source and the accumulator.

Again according to the invention the valve is (or a plurality of valves are) pressure-operated against a substantially zero-rate compression spring having the character of an Euler spring-strut; in such case the valve will operate in one sense at a pressure slightly above a critical pressure and in the alternative sense at a pressure slightly below the critical pressure, with a "snap" action.

A valve according to the invention and operating as above, will be described below, by way of three examples, with reference to the accompanying drawings which are diagrams of the system, with the valve illustrated in section.

Figure 1:
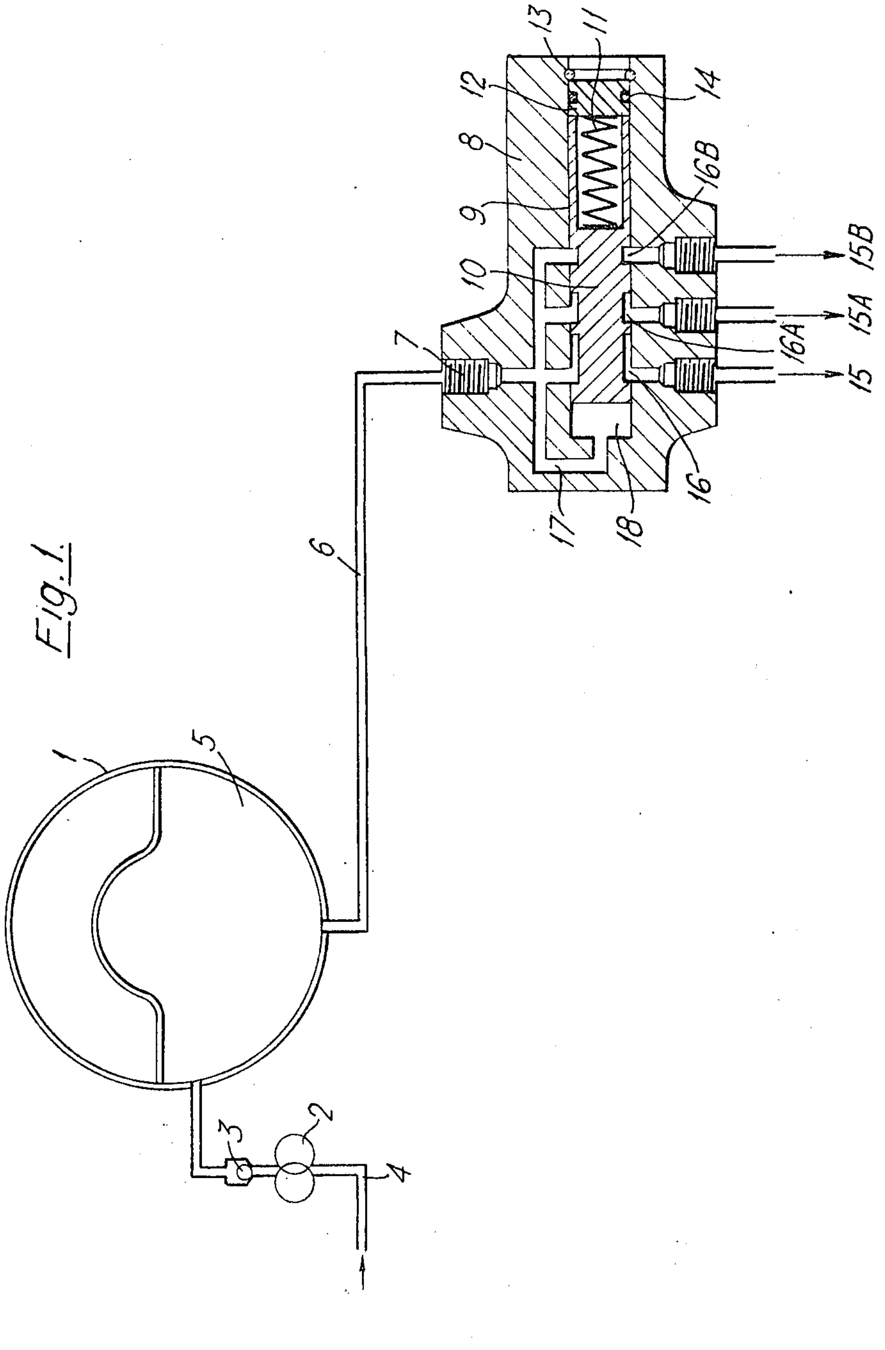
FIG. 1 illustrates the first example, in which three slave services are indicated.

In the FIG. 1 example a pressure accumulator 1 is charged by a pump 2 through a non-return valve 3, the pump drawing upon a usual reservoir (not shown) via supply line 4. Pressure fluid 5 in the accumulator 1 flows via line 6 and connector 7 to a valve body 8 which is cylindrically bored at 9. In the bore 9 is a cylindrical spool 10, urged one way (in this case to the left) by a spring 11; the spring is retained by a plug 12 which is sealed by an O ring 14 and held by a circlip 13. The plug 12 may, alternatively, be threaded and therefore be capable of adjusting the spring load.

The spool 10 has three annular grooves 16, 16A, 16B, all supplied by a manifold duct 17 in the body 8 supplied by the connector 7. The duct 17 also connects with a pressure chamber 18 at the end of the spool 10, in which the supply pressure urges the spool 10 against the spring 11.

The body 8 has three ports 15, 15A, 15B which are connected to three slave services. Notionally 15 leads to brakes, (which we suppose to be the service requiring "top priority") 15A to steering, and 15B to self-levelling slave services. The ports 15, 15A, 15B in normal operating conditions (spool 10 to the right as drawn and spring 11 fully compressed) are supplied from the mainfold duct 17 via the grooves 16, 16A, 16B respectively. The lap of these is so arranged that if the supply pressure acting in the chamber 18 decreases so as to allow spool movement to the left, then in sequence, service 15B is first cut off, then service 15A; service 15 is not cut off.

The space to the right of the spool may be "breathed" to avoid a build-up of pressure therein impairing the proper action of the spool.

Figure 2:
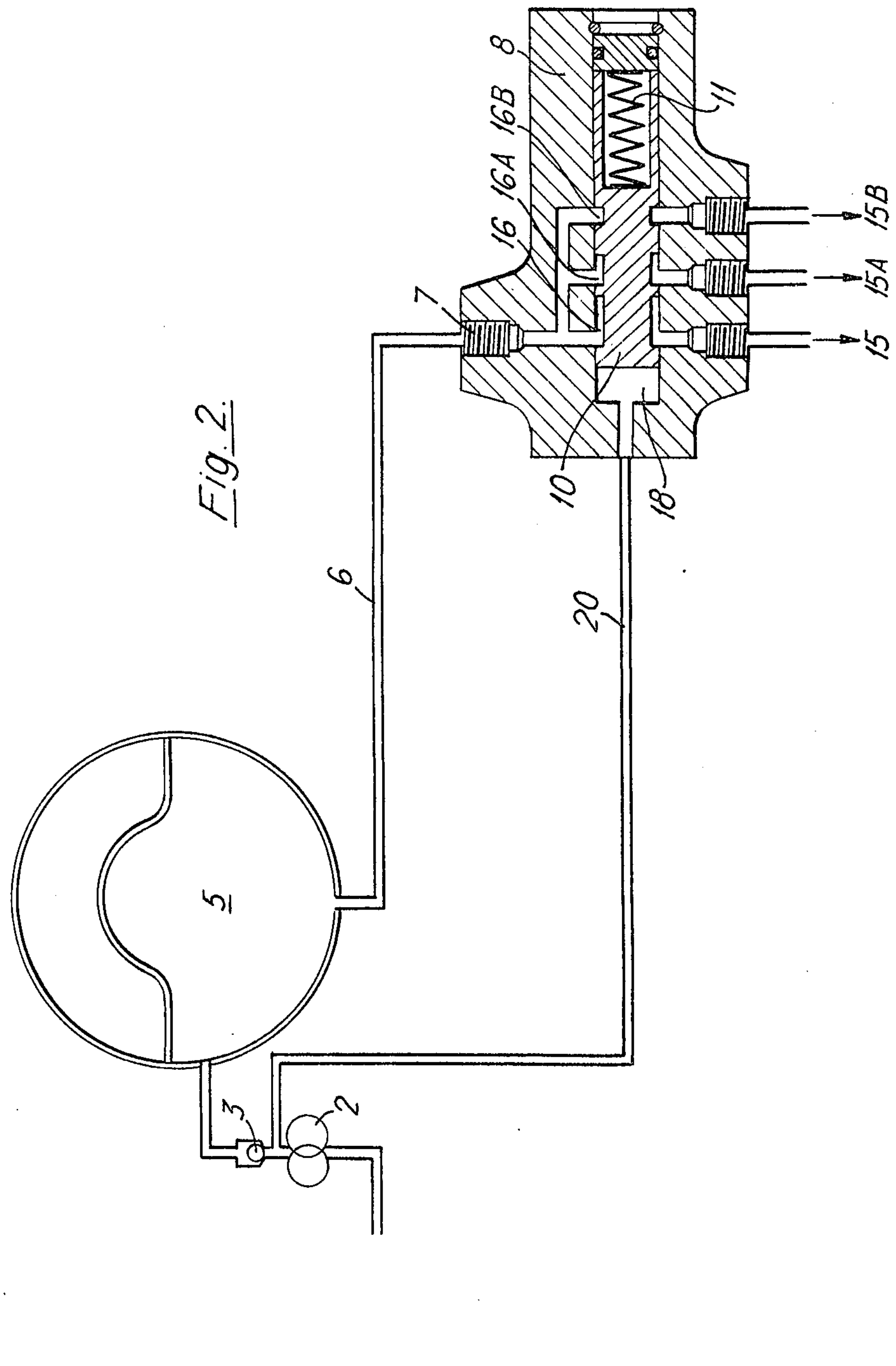
FIG. 2 illustrates the second example in which the same three slave services are indicated but a variant makes the whole accumulator pressure fluid available to one — preferably the brake — slave service in the event of pump failure.

In the FIG. 2 variant of the invention, the manifold duct from the connector 7 is connected only to the grooves 16, 16A, 16B and not to the chamber 18. Instead, the chamber 18 is connected by a separate line 20 to the pump output upstream of the non-return valve which prevents accumulated fluid returning to the pump. Then, if there is a pump failure, the whole accumulator pressure-fluid charge is available for brakes, because the spool 10 will be in its extreme left-hand position (pressure in chamber 18 being nil or sub-standard) so that the slave services through 15A, 15B, are cut off.

Now considering FIGS. 3 and 3A, we again see the basic pressure source, namely the pump 2 supplied from reservoir by the line 4 and delivering through non-return valve 3 to pressure accumulator 5. From the accumulator 5, line 30 delivers to the valve body 31. There are three exits from the valve body 31; exit 32 is to the "top priority" slave service (which, in the vehicle application which has been discussed, we consider to be the brake service). The next exit is 33, and this leads to a second slave service which might well be power-assisted steering. The third exit, 34, is through a line which returns fluid to the ordinary reservoir from which is supplied the pump 2, and this is provided in order to bleed back to reservoir any fluid which has fortuitously passed the valve spool.

Figure 3:
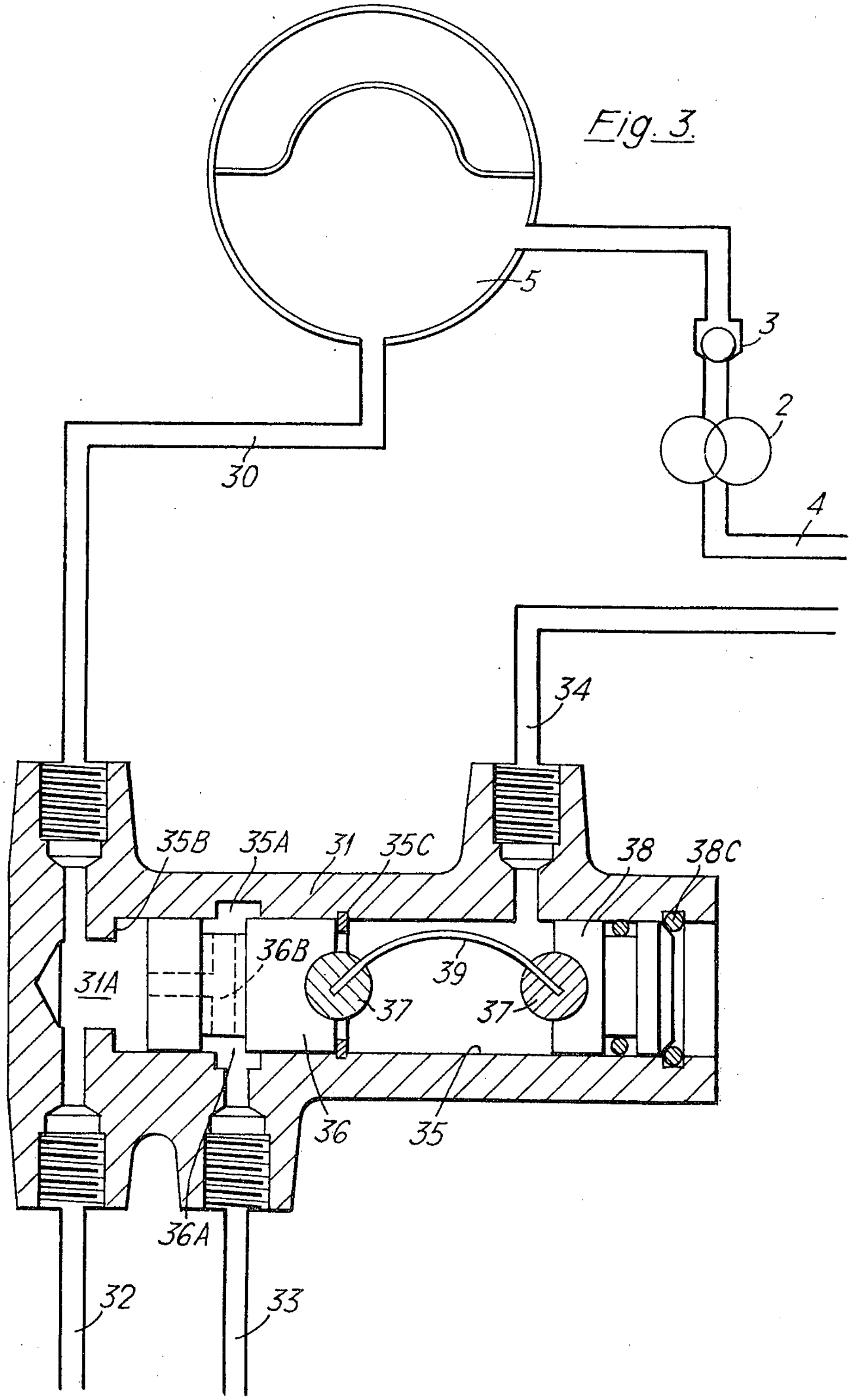
FIG. 3 and 3A illustrate a modification, of which the object will be made clear, and for simplicity is shown with only two slave services.
Figure 3A:
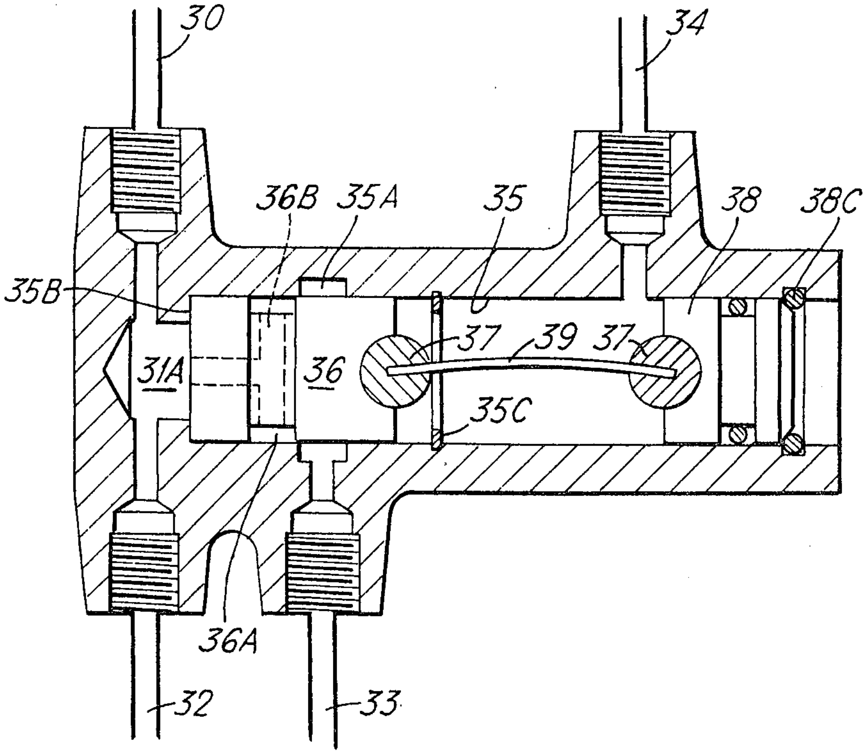

The valve body 3 is cylindrically bored at 35, and within its bore there is an internal annular groove 35A, a neck or reduction formed by a shoulder 35A, and a stop at 35C formed by a circlip ring. The shoulder 35A and stop 35B limit the sliding movement in the bore 35 of a valve spool 36. The spool 36 has an annular waist at 36A to register openly with the groove 35A when the spool is in its right-hand position, as seen in FIG. 3. When the spool is in its left-hand position as in FIG. 3A, there is total cut off. Open to the lines 30 and 32 (within the body 31) is a pressure chamber 31A.

In the spool 36 through its left-hand end, there is a passage 36B which interconnects the chamber 31A and the waist at 36A. Borne in a cylindrical concavity in the right-hand end of the spool 36 is one of two arbours 37 the other of which is similarly borne against a disc 38, sealed by an O-ring 38A, which disc butts against an internal circlip stop 38C located in the bore 35. Grooved into the arbours 37 are the two ends of a single leaf spring-strut 39. As can be seen by comparing FIGS. 3 and 3A, when the spool 36 is at its left-hand extreme position (FIG. 3A) the spring-strut 39 is nearly straight though slightly bowed in the same sense as that in which it is fully bowed in FIG. 3, wherein the spool 36 is in its extreme right-hand position.

The spring-strut 36 is, then, a spring of the kind known as an "Euler strut" and it has the property that, very minor manufacturing inaccuracies disregarded, it is a compression spring of zero rate. It follows that after a certain critical pressure in chamber 31A is slightly exceeded, the spool 36 will move its full travel, from its stop at 35B to its stop at 35C, almost with a "snap" action. The waist 36A now opens to the groove 35A (with which it now registers) so that pressure fluid from 30 and 31A, passing via 36B, can flow out through line 33 and thus actuate the second slave service. If, however, the pressure in 31A falls below the critical pressure, the spring strut 39 returns, the spool to the "FIG. 3" position, again with almost "snap" action, so that pressure fluid can only pass through line 32 to the "top priority" service. The pressure is of course, that which is contained in the accumulator 5. It is clear that the whole "rateless" valve so described may be multiplied in number. Thus if there were a "top priority" slave system and (say) two further slaves required to operate at two different pressures, two spools and their appendages would be provided (maybe in a common valve body) and the spring strut of each would determine the pressures at which they would respectively "snap" open for slave flow. The springs, in such a case, would of course be selected to determine the critical pressures: or (or also) the effective cross-sectional areas of the spools may be selectively varied to the same effect. Thus, for example, there might be as "top priority" service the brakes at (say) 1,000 p.s.i., a power-assisted steering system at 1500 p.s.i., and a self-levelling system at 2,000 p.s.i.

The object of the arbors 37 is simply to minimise friction and wear and to avoid any noticeable "stiction" which might cause malfunctioning of the spring strut 39.

It is to be observed that the invention is capable of wide application, the described case of vehicle control being merely one example. For instance, an implement bearing tractor might have several controls of varying order of importance, such as steering, hoisting, jibbing, or uffing, each being operated by its own slave system. The designer may by the invention, select what he deems to be the priorities of requirement, and still provide but one basic energy source, viz. the single pump and pressure accumulator.

I claim:

1. A hydraulic system in which a source of pressure-fluid charges a pressure accumulator and the accumulator supplies pressure fluid to first and further slave services with preselected priority of supply, characterized by the provision of valve means connected between the accumulator and the slave services and operated by the source pressure in opposition to resilience, a first line connecting the valve means to the contents of the accumulator and a second line connecting the valve means to the source of pressure-fluid whereby the valve means is acted upon directly by the source of pressure-fluid to operate the valve, the position of the valve means when so operated determining which of the further slave services receives pressure-fluid from the accumulator so that the selection of slave services to be supplied is dependent upon the source pressure.

2. The system of claim 1 including a resiliently loaded valve which, according to its position, connects a particular one or more of the slave services to the accumulator, the position of the valve being determined by the source pressure in opposition to the resilient load on said valve.

3. A system according to claim 2, in which the valve takes the form of a spool slidable in a valve body, one end of the spool being exposed in piston-like manner to the fluid pressure and spring means are structurally associated with said spool to urge said spool against such pressure.

4. A system according to claim 2 in which said valve is in the form of a spool about which a plurality of annular grooves are formed, each of said grooves being positionable to interconnect an associated slave service with the accumulator, according to the position of the resiliently loaded valve.

5. A system according to claim 1, wherein a non-return valve is interposed between the pressure source and the accumulator in such manner as to retain pressure in the accumulator, and said second line is connected to the source upstream of such non-return valve so that the valve-operating pressure is imposed on the valve directly by the source of pressure and not by the accumulator pressure.

6. A system according to claim 1 in which said valve has grooves formed therein, each of said grooves being positionable to interconnect an associated slave service in flow communication with the accumulator, according to the position of the valve.

7. A hydraulic system in which a source of pressure fluid charges a pressure accumulator and the pressure accumulator supplies pressure fluid at all times to a first slave service and optionally to further slave services, the selection of further slave services to receive fluid depending on the pressure of the pressure fluid, comprising, a pump connected in flow communication to a pressure accumulator, said pressure accumulator connected in flow communication via connector means and a first line to a valve body, a plurality of ports formed in said valve body and connected in flow communication to respective associated further slave services and, through said valve body, to said pressure accumulator, a bore formed within said valve body and having a spool movably mounted therein, said spool being provided with resilient loading means to urge said spool in a direction within said bore to cut off flow between said pressure accumulator and at least one of said ports, a pressure chamber formed within said valve body in flow communication with said spool, means comprising a second line which by-passes said accumulator and serves to connect said pressure chamber in flow communication with said source of pressure fluid whereby said pressure fluid urges said spool against said resilient loading means in a direction to permit flow between said pressure accumulator and all of said plurality of ports.

8. A hydraulic system in which a source of pressure fluid supplies pressure fluid with preselected priority of supply to first and further slave services includes a resiliently loaded valve means, a pressure accumulator connected between the source of pressure fluid and the valve means, the slave services being supplied with pressure fluid via the accumulator and through said valve means, said valve means being operated by the source pressure imposed in opposition to resilience of the valve means, the position of the valve means when so operated determining which of the further slave services is connected to receive pressure fluid from the accumulator, the source pressure operating the valve in opposition to its resilience being imposed on the valve by supplying pressure fluid thereto directly from the source pressure.

9. A hydraulic system includes a source of pressure fluid and a pressure accumulator connected so as to be charged with pressure fluid by said source and so as to supply its charged contents to all of a plurality of slave services, said charged contents being constantly available to at least one such slave service through resiliently loaded valve means and a first line which connects the contents of the accumulator to the valve means, a second line connects the source of pressure fluid to the valve whereby pressure fluid which by-passes the accumulator is supplied directly from the source of pressure fluid to the valve means, and the opening and closing of the valve means is governed by the by-passed pressure fluid acting in opposition to resilience of the valve means, such opening and closing allowing or preventing flow of the charged contents of said accumulator to at least one further slave service.

* * * * *